(12) United States Patent
Hu et al.

(10) Patent No.: US 8,208,350 B1
(45) Date of Patent: Jun. 26, 2012

(54) ENERGY ASSISTED MAGNETIC RECORDING HEAD HAVING A NEAR FIELD TRANSDUCER WITH REDUCED THERMAL PROTRUSION

(75) Inventors: Yufeng Hu, Fremont, CA (US); Wentao Yan, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/287,230

(22) Filed: Nov. 2, 2011

Related U.S. Application Data

(62) Division of application No. 12/415,465, filed on Mar. 31, 2009, now Pat. No. 8,077,418.

(51) Int. Cl.
*G11B 11/00* (2006.01)
(52) U.S. Cl. .............. 369/13.33; 369/13.13; 360/59; 29/603.07; 29/603.16
(58) Field of Classification Search ............. 369/13.33, 369/13.13, 13.02, 13.32, 112.09, 112.14, 369/112.21, 112.27; 360/59; 385/129, 31, 385/88–94; 29/603.01–603.27; 250/201.3, 250/201.5; 451/65
See application file for complete search history.

(56) References Cited

U.S. PATENT DOCUMENTS

| | | | | |
|---|---|---|---|---|
| 5,034,828 A * | 7/1991 | Ananth et al. | ............... | 360/75 |
| 5,632,669 A * | 5/1997 | Azarian et al. | ............... | 451/54 |
| 5,772,493 A * | 6/1998 | Rottmayer et al. | ........... | 451/5 |
| 5,885,131 A * | 3/1999 | Azarian et al. | ............... | 451/5 |
| 5,963,513 A * | 10/1999 | Lemelson | .................. | 369/14 |
| 6,568,992 B1 * | 5/2003 | Angelo et al. | ................ | 451/8 |
| 6,795,630 B2 * | 9/2004 | Challener et al. | ......... | 385/129 |
| 6,857,937 B2 * | 2/2005 | Bajorek | ..................... | 451/5 |
| 6,895,657 B2 * | 5/2005 | Mishima et al. | ......... | 29/603.07 |
| 7,086,931 B2 * | 8/2006 | Oyama et al. | ................. | 451/7 |
| 7,336,443 B2 * | 2/2008 | Bonin | ..................... | 360/234.7 |
| 8,077,418 B1 | 12/2011 | Hu et al. | | |
| 2005/0078565 A1 * | 4/2005 | Peng et al. | ................ | 369/13.32 |
| 2006/0067001 A1 * | 3/2006 | Hsu et al. | ................. | 360/234.3 |
| 2007/0014041 A1 * | 1/2007 | Lille et al. | ..................... | 360/6 |
| 2007/0064332 A1 * | 3/2007 | Higashiya | ................. | 360/75 |

(Continued)

FOREIGN PATENT DOCUMENTS

JP 2005011414 A 1/2005

OTHER PUBLICATIONS

Office Action dated Dec. 22, 2010 from U.S. Appl. No. 12/415,465, 11 pages.

(Continued)

*Primary Examiner* — Tan X Dinh

(57) ABSTRACT

An energy assisted magnetic recording head comprises a slider having a leading edge, a trailing edge, and an air bearing surface (ABS), and a near field transducer (NFT) disposed in the slider and having a distal end proximate the ABS. The distal end is recessed from the ABS when no optical power is applied to the NFT, and is co-planar with the ABS when a predetermined amount of optical power is applied to the NFT. A portion of the slider surrounding the distal end forms a concave surface having a continuously varying slope when no optical power is applied to the NFT, and a flat surface coplanar with the ABS and the distal end when the predetermined amount of optical power is applied to the NFT. Applying optical power comprises coupling light into a waveguide formed in the head and directing the coupled light to the NFT via the waveguide.

10 Claims, 4 Drawing Sheets

U.S. PATENT DOCUMENTS

| | | | |
|---|---|---|---|
| 2008/0068748 A1* | 3/2008 | Olson et al. | 360/110 |
| 2008/0094755 A1* | 4/2008 | Ota et al. | 360/235.4 |
| 2008/0100965 A1* | 5/2008 | Oki | 360/234.3 |
| 2008/0151427 A1* | 6/2008 | Poon et al. | 360/235.4 |
| 2009/0165285 A1* | 7/2009 | Takayama et al. | 29/603.09 |
| 2009/0168248 A1* | 7/2009 | Matsumoto et al. | 360/235.7 |

OTHER PUBLICATIONS

Office Action dated Jun. 3, 2011 from U.S. Appl. No. 12/415,465, 6 pages.

Notice of Allowance dated Aug. 9, 2011 from U.S. Appl. No. 12/415,465, 7 pages.

* cited by examiner

ENERGY ASSISTED MAGNETIC RECORDING HEAD HAVING A NEAR FIELD TRANSDUCER WITH REDUCED THERMAL PROTRUSION

CROSS-REFERENCE TO RELATED APPLICATION

This application is a divisional of pending U.S. patent application Ser. No. 12/415,465, filed Mar. 31, 2009, which is incorporated herein by reference in its entirety.

FIELD OF THE INVENTION

The present invention generally relates to magnetic recording heads and, in particular, relates to reducing the thermal protrusion of a near field transducer (NFT) in an energy-assisted magnetic recording (EAMR) head.

BACKGROUND OF THE INVENTION

To increase the areal storage density of a magnetic recording device, the recording layer thereof may be provided with smaller and smaller individual magnetic grains. This reduction in grain size soon reaches a "superparamagnetic limit," at which point the magnetic grains become thermally unstable and incapable of maintaining their magnetization. The thermal stability of the magnetic grains can be increased by increasing the magnetic anisotropy thereof (e.g., by utilizing materials with higher anisotropic constants). Increasing the magnetic anisotropy of the magnetic grains, however, increases their coercivity and therefore requires a stronger magnetic field to change the magnetic orientation of the grains (e.g., in a write operation).

Energy-assisted magnetic recording (EAMR) is used to address this challenge. In an EAMR system, a small spot where data is to be written is locally heated to reduce the coercivity of the magnetic grains therein for the duration of the write operation, thereby allowing materials with increased magnetic anisotropy to be used, and greater areal storage density to be exploited.

To reduce the size of the spot which is heated, a near field transducer (NFT) is used to concentrate optical energy in the near field to dimensions much smaller than the diffraction limit would otherwise allow. With a NFT, a nano-sized spot can be heated to assist the magnetic writing on the magnetic media. Due to the less-than-ideal NFT conversion efficiency, some of the optical energy provided on the NFT is absorbed by the materials near an air-bearing surface (ABS) surrounding the NFT, and heat-related protrusion and of the NFT and the surrounding materials may occur.

SUMMARY OF THE INVENTION

Various embodiments of the present invention solve the foregoing problem by modifying the ABS of the EAMR head to compensate for the NFT protrusion, thereby preventing protrusion-related damage to the NFT which may occur. These approaches provide a reliable method of forming EAMR heads without the aforementioned problems, and can greatly enhance reliability of the EAMR heads.

According to one embodiment of the subject disclosure, a method of fabricating an energy assisted magnetic recording (EAMR) head to compensate for a heat-induced protrusion of a near field transducer formed therein can comprise applying optical power to the near field transducer to generate heat therein, whereby the near field transducer protrudes beyond an air bearing surface of the EAMR head. The method can further include removing a protruded portion of the near field transducer.

According to another embodiment of the subject disclosure, an energy assisted magnetic recording (EAMR) head is provided. The EAMR head can comprise a slider having a leading edge, a trailing edge, and an air bearing surface (ABS). The EAMR head can further comprise a near field transducer disposed in the slider and having a distal end proximate the ABS. The distal end of the near field transducer is recessed from the ABS when no optical power is applied to the near field transducer, and is co-planar with the ABS when a predetermined amount of optical power is applied to the near field transducer. A portion of the slider surrounding the distal end forms a concave surface having a continuously varying slope when no optical power is applied to the near field transducer, and a flat surface coplanar with the ABS and the distal end of the near field transducer when the predetermined amount of optical power is applied to the near field transducer.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention. The word "exemplary" is used herein to mean "serving as an example, instance, or illustration." Any embodiment or design described herein as "exemplary" is not necessarily to be construed as preferred or advantageous over other embodiments or designs.

Figure 1:
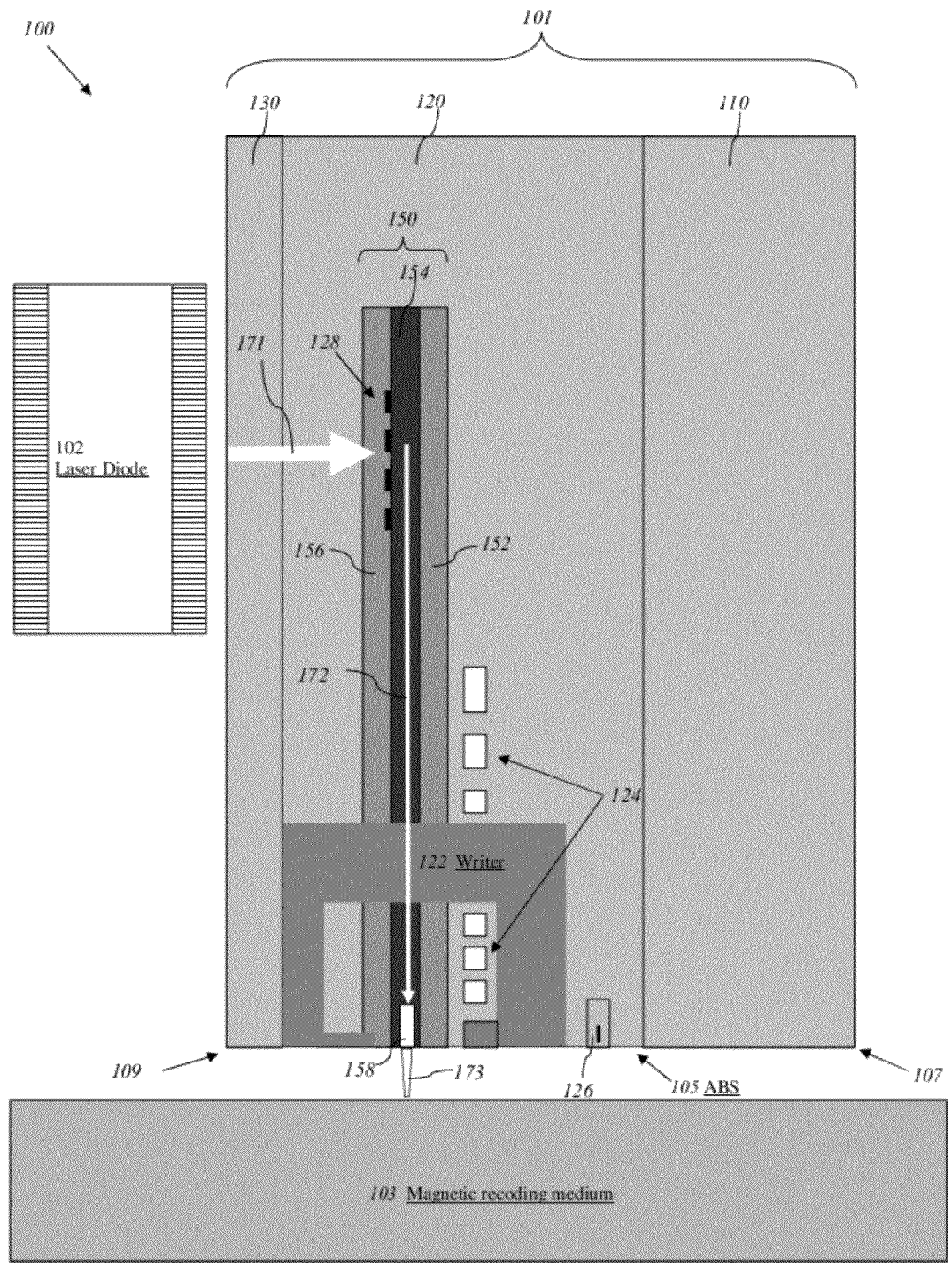
FIG. 1 is a schematic diagram illustrating an exemplary EAMR head comprising a slider and a near field transducer according to one aspect of the subject technology.

FIG. 1 is a schematic diagram illustrating an exemplary EAMR head 100 comprising a slider 101 and a near field transducer 158 according to one aspect of the subject technology. The slider 101 comprises a substrate 110, a recorder/reader layer 120 disposed over the substrate 110, and an overcoat layer 130 disposed over the recorder/reader layer 120. In the illustrated example, the substrate 110 comprises AlTiC and the overcoat layer 130 comprises alumina. The slider 101 has a leading edge 107 and a trailing edge 109, and an air-bearing surface (ABS) 105 facing a magnetic recording medium 103. The recorder/reader layer 120 of the slider 101 includes a writer 122 for recording or erasing information on the medium 103 by focusing a magnetic field on a spot on the medium 103, a coil 124 for generating the magnetic field, a reader 126 for reading a magnetic bit recorded on the medium 103, and a waveguide structure 150. The waveguide structure 150 is configured to couple incident laser beam 171 from a laser diode 102 into a waveguide core layer 154 disposed in the coupler 150. The waveguide structure 150 includes a first clad layer 152 and a second clad layer 156 surrounding the waveguide core layer 154. Disposed at an interface between the second clad layer 156 and the waveguide core layer 154 is a grating 128 having a period and a depth selected to couple incident laser beam 171 into waveguide core layer 154. The waveguide structure 150 further includes a near field transducer (NFT) 158 formed at a distal end of the waveguide structure 150 proximate the ABS 109. The NFT 158 is configured to concentrate energy from the laser beam to a nano-sized spot on the recording medium 103 well below the so-called "diffraction limit" imposed on standard focusing lenses. The NFT 158 is typically formed of a metal such as gold (Au), silver (Ag), aluminum (Al), copper (Cu), or a combination (alloy) thereof.

The EAMR head 100 can also includes a laser diode 102 configured to generate a laser beam in response to an electrical power applied thereto. In certain embodiments, the laser diode is affixed to the slider 101. In some embodiments, the laser diode can be a vertical-cavity-surface-emitting laser (VCSEL). In other embodiments, the laser diode 102 can be a separate structure disposed at a certain distance from the slider 101 and transmitting light to the waveguide structure 150 via an airgap.

During the operation of a hard disk drive comprising the EAMR head 100, the magnetic recording medium 103 rotates at high speed, and air flowing at high speed between the ABS 105 and the magnetic recording medium 103 provides an upward force to the slider 101 such that the slider 101 is maintained at a certain height from the magnetic recording medium 103. A portion of the incident laser beam 171 emitted by the laser diode 102 and arrived at the waveguide structure 150 is coupled into the waveguide core layer 154 by means of the grating 128 to form a coupled laser beam 172 traveling down the waveguide core layer 154 toward the ABS 105. The coupled laser beam 172 is concentrated onto a nano-sized spot on recording medium 103 by means of the NFT 158. The nano-sized heated spot on the magnetic medium 103 is subsequently subjected to a pulse of write magnetic field from the writer 122.

Viewed from the perspective of a power flow, a portion of an electrical energy provided to the laser diode 102 is converted into an incident optical power by the laser diode 102 in the form of the incident laser beam 171. A portion of the incident optical power is coupled into the waveguide core layer 154 as a coupled optical power in the form of the coupled laser beam 172. A portion of the coupled optical power is transmitted to the magnetic recording medium 103 as near field radiation 173, which is absorbed by a nano-sized spot on the magnetic recording medium 103 to generate heat therein.

Figure 2:
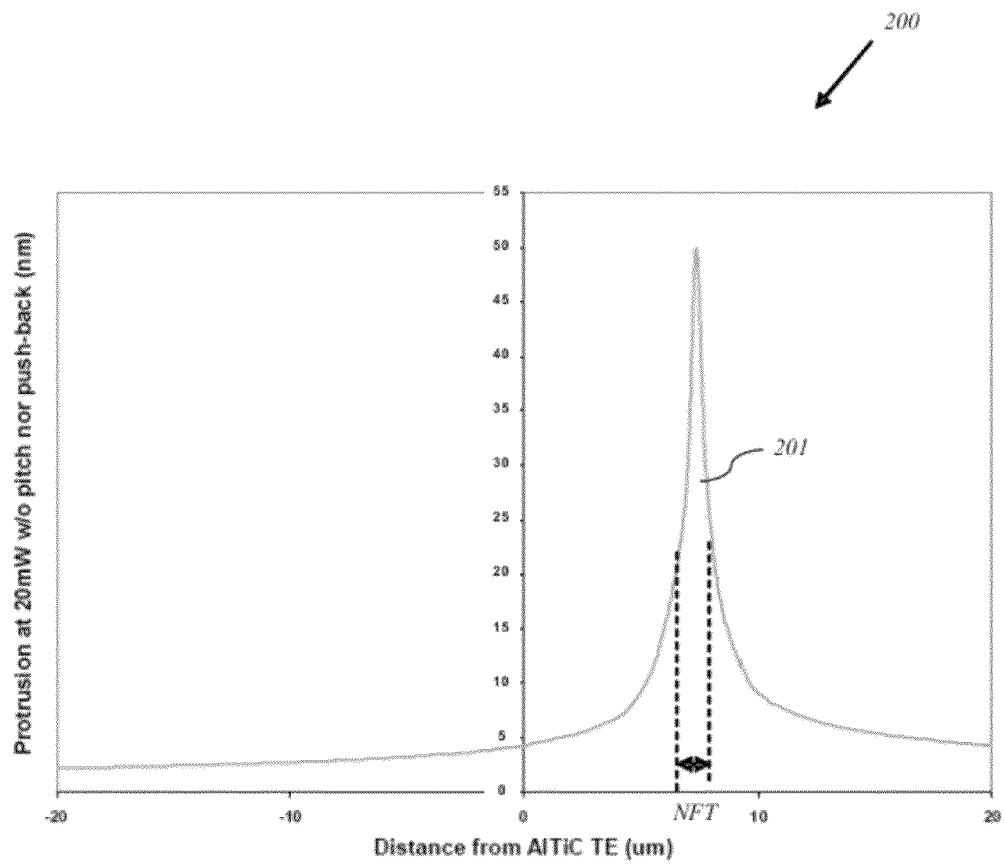
FIG. 2 is a graph showing a simulated trace of a heat-induced protrusion according to one aspect of the subject technology.

Typically, an optical conversion efficiency of the NFT 158—the percentage of the coupled optical power converted into the focused optical power using the above-defined terminologies—is in the range of 1-10%. A portion of the coupled optical power not converted into the focused optical power generates heat at the NFT and a surrounding region. The heat at NFT 158 and the surrounding portion of the slider may cause the region to protrude above the ABS 105. FIG. 2 is a graph showing a simulated trace 201 of such a heat-induced protrusion as a function of a distance measured from the left edge of the substrate 110 (FIG. 1), with the + direction being towards the trailing edge 109 of the slider 101. The trace 201 shows a sharp protrusion at a region comprising the NFT and a portion of the slider surrounding the NFT, with its peak occurring at the center of the NFT. This simulation is performed with the assumption that 20 mW of optical power is applied to a volume of 273 nm×180 nm×100 nm at the write gap (WG). It can be seen that the protrusion is very localized due to the small size of the heat source. In the simulation embodiment, the maximum protrusion beyond the ABS is seen to be 50 nm at 20 mW. Even if the optical power is reduced by half, e.g., to 10 mW, the NFT protrusion above the ABS is still in the range of 20-30 nm. Considering that the slider can float at a height in the range of few nanometers above the magnetic recording medium, such a heat-induced NFT protrusion may result in the chipping or cracking of the NFT and damage to the recording media.

Figure 3:
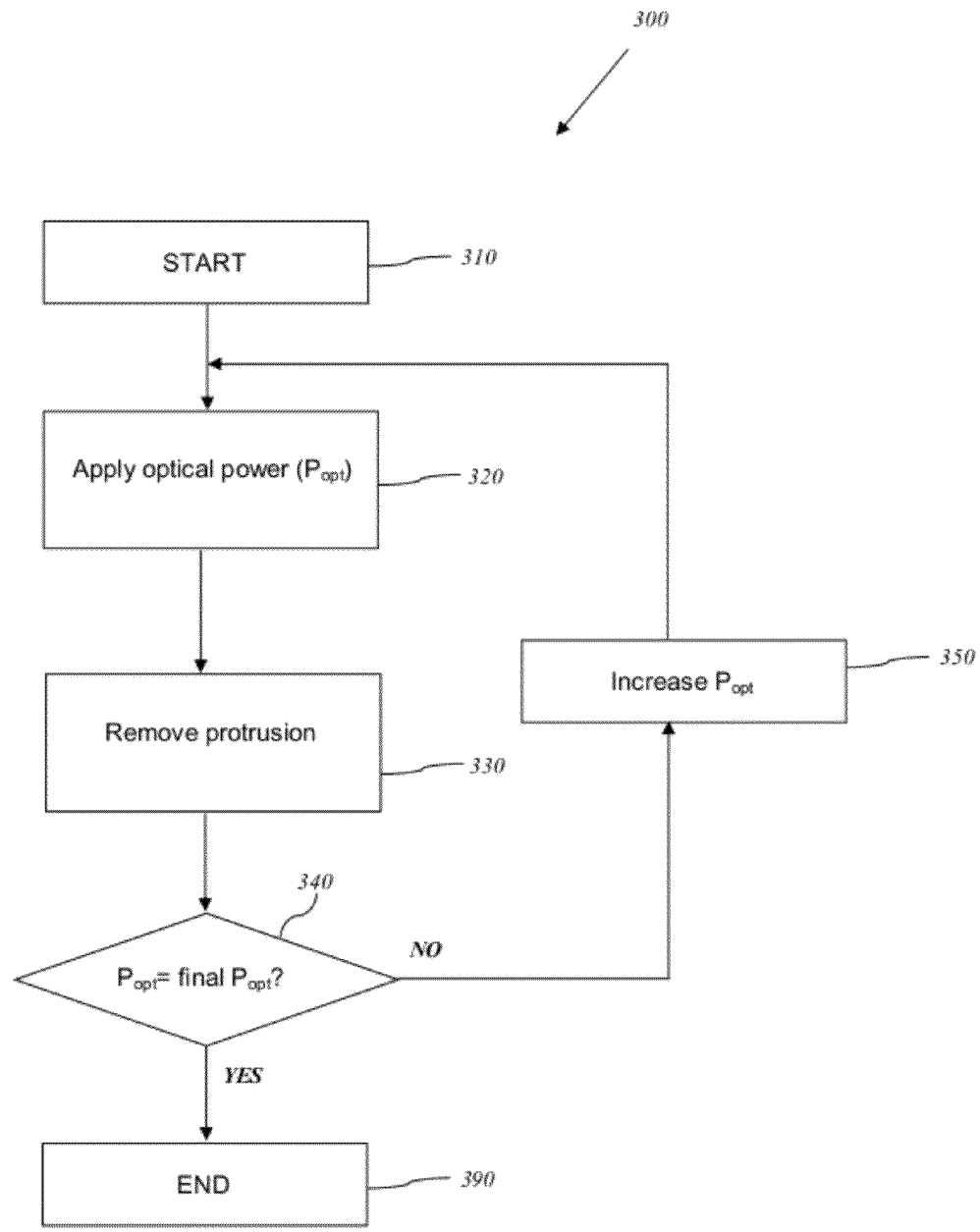
FIG. 3 is a flowchart illustrating an exemplary iterative heat-and-remove process for producing an EAMR head according to one aspect of the subject technology.

To reduce or eliminate such a heat-induced NFT protrusion, a fabrication process of the EAMR head can be configured to modify a shape of a region of the ABS surrounding the NFT to compensate for the heat-induced NFT protrusion, according to one aspect of the subject technology. In particular, the process can involve iteratively applying increasingly larger levels of optical power to the NFT, thereby generating heat in the NFT and the surrounding region, and removing a corresponding heat-induced protrusion at the NFT and the surrounding slider portion. FIG. 3 is a flowchart illustrating an exemplary iterative heat-and-remove process 300 for producing an EAMR head. The iterative heat-and-remove process 300 begins at state 310 and proceeds to a state 320, in which a first level of optical power ($P_{opt}$) is applied to the NFT. As explained above, the optical power is delivered to the NFT in the form of a laser light (e.g., the coupled laser beam 172 of FIG. 1), and the optical power generates heat in the NFT and a surrounding portion of the slider. The laser light and its associated optical power can be coupled from a laser source (either affixed to the slider or separate) into a waveguide (e.g., the waveguide structure 150 of FIG. 1) formed in the EAMR head and directed to the NFT. Alternatively, the laser light can be applied directly to the NFT from an external laser source during the fabrication process. Regardless of the chosen channel, the first level of optical power carried by the laser light generates heat at the NFT, which heat, in turn, induces a first localized protrusion in a region comprising the NFT and the surrounding slider portion as described above.

The process 300 proceeds to a state 330, in which the first localized protrusion is removed by, e.g., a bar lapping process. In one embodiment, the bar lapping process is a chemical-mechanical polishing (CMP) process. In certain embodiments, the removal process is performed while a constant optical power is applied to the NFT. In other embodiments, the optical power is increasing while the removal process is in progress. In yet other embodiments, the optical power is temporarily turned off during the removal process. The process 300 proceeds to a decision state 340, in which a query is made as to whether $P_{opt}$ has reached a preset final optical power. In certain embodiments, the preset final optical power corresponds to an operational level of optical power for use during a recording operation of the EAMR head. In other embodiments, the preset final optical power can be a level of optical power different from the operational level due to the need to compensate for a thermal variation caused by the removal process or due to the fact that the optical power is being delivered by an external laser source during the fabrication process in which case the optical power required to produce the same amount of heat at the NFT may be different from the operational optical power delivered via the waveguide structure.

If the answer to the query at the decision state 340 is YES, the process 300 ends at state 390. On the other hand, if the answer is NO, the process 300 continues at a state 350, in which the optical power is increased to a next level, and then proceeds to the state 320, in which the next level of optical power is applied to the NFT. The next level of optical power generates a next level of heat at the NFT, which heat, in turn, induces a next localized protrusion in the region comprising the NFT and the surrounding slider portion. The next localized protrusion is removed at the state 330. The heat-and-remove process of the states 320, 330, 340, and 350 is repeated until the optical power has reached a preset final optical power.

It shall be appreciated that many variations to the iterative heat-and-remove process 300 described above are possible without departing from the scope of the present disclosure. For example, in those embodiments in which a constant or increasing optical power is applied during the removal process, the states 320 and 330 may be combined into a single state, in which the localized protrusion is removed while the constant or increasing optical power is applied to the NFT. In the latter case in which the optical power is increased during the removal process, the state 350 may not be performed as a separate step. The iterative heat-and-remove process 300 described above is terminated when the optical power reaches a preset final optical power. For example, according to one aspect of the subject technology, the process may complete after a preset number of steps (e.g., 10 of 2 mw increments for an exemplary final optical power of 20 mw). Alternatively, the process may be terminated after a certain other condition is satisfied. For example, the temperature of the ABS near the NFT can be measured by a contact or remote measurement method, and the process can be terminated when the measured temperature reaches a preset final temperature.

Figure 4A:
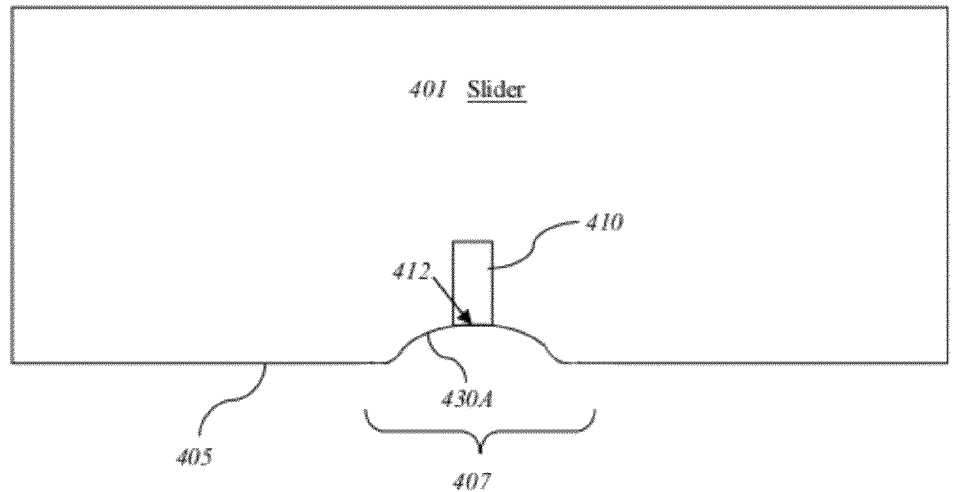
FIG. 4A is a cross-sectional views of a slider having a NFT modified by an iterative heat-and-remove process according to one aspect of the subject technology when no optical power is applied to the NFT.
Figure 4B:
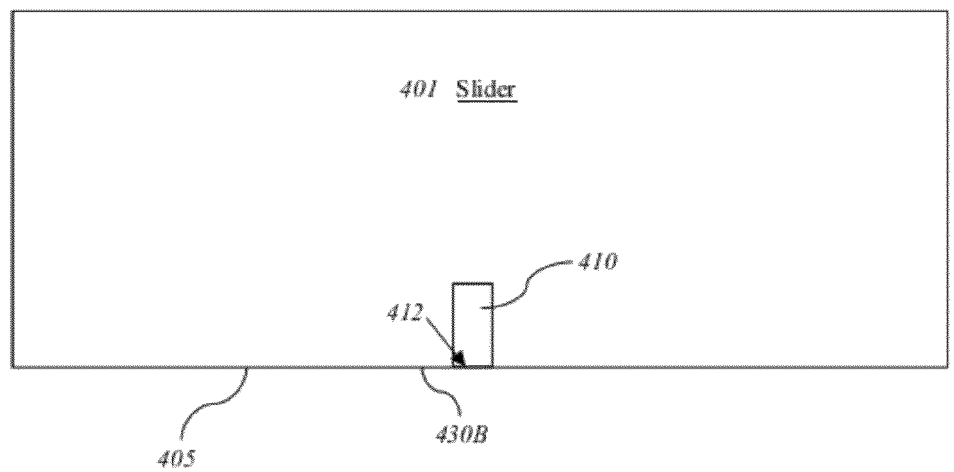
FIG. 4B is a cross-sectional views of a slider having a NFT modified by an iterative heat-and-remove process according to one aspect of the subject technology when an operational optical power is applied to the NFT.

An iterative heat-and-remove process such as the one described above with respect to FIG. 3 is superior to a single (non-iterative) heat-and-remove process in which a preset maximum optical power is applied to the NFT and the corresponding heat-induced protrusion is removed in a single step, because such a single heat-and-remove process can lead to an abrupt breakage in the NFT protrusion and cause an attendant damage to the NFT during the removal process. By iteratively applying increased levels of heat to the NFT and removing corresponding incremental protrusions, the iterative heat-and-remove method described herein can prevent breakage of the NFT and also produces a smooth surrounding concave surface in the slider at the end of the removal process. FIGS. 4A and 4B are cross-sectional views of a slider 401 having a near field transducer (NFT) 410 modified by an iterative heat-and-remove process such as the one described above. FIG. 4A corresponds to a case in which no optical power is applied to the NFT 410, and FIG. 4B corresponds to a case in which an operational optical power (e.g., the optical power to be used during a recording operation) is applied to the NFT 410. The shown section of the slider 401 has an ABS 405. The NFT 410 has a distal end 412 proximate the ABS 405. The distal end 412 of the NFT 410 is recessed from the ABS 405 when no optical power is applied to the NFT 410 as shown in FIG. 4A, and is co-planar with the ABS 405 when a predetermined amount of optical power (e.g., an operational optical power) is applied to the NFT 410 as shown in FIG. 4B. A portion of the slider 401 surrounding the distal end 412 of the NFT 410 forms a concave surface 430A having a continuously varying slope when no optical power is applied to the NFT 410 as shown in FIG. 4A, and a substantially flat surface 430B coplanar with the ABS 405 and the distal end 412 of the NFT 410 when the predetermined optical power is applied to the NFT 410. As shown in FIG. 4A, for example, there is a smooth transition from the ABS 405 to the concave surface 430A without a sharp edge such as a 90-degree bend. Similarly, there is a smooth transition from the concave side surface to the bottom of the recess without a sharp edge such as a 90-degree bend. Put another way, a region 407 comprising the concave surface 430A and its surrounding ABS portion has a continuously-varying slope (e.g., continuously differentiable without a discontinuity).

A recess having such a smooth surface with a continuously-varying slope caused by the iterative heat-and-remove process described herein has several advantages over a recess having sharp 90-degree edges at the top and bottom of the recess. For example, the smooth surface reduces the risk of having debris particles stuck in the recess after the fabrication and causing aberrations (e.g., absorption, attenuation, diffraction, divergence) in the focused laser beam pattern. In addition, as FIG. 4B illustrates, the smoothed-surface recess turns into a flat surface co-planar with the ABS 405 and the distal end 412 of the NFT 410 when an operational optical power is applied to the NFT 410. In contrast, a recess having 90-degree edges at the top and bottom when no optical power is applied turns into an irregular surface not coplanar with the ABS and the NFT when an operational optical power is applied to the NFT. Such a non-coplanar surface can produce a portion of the slider slightly protruding beyond the ABS or the distal end of the NFT slightly below the ABS with the attendant degradation in the focusing ability of the NFT.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. An energy assisted magnetic recording (EAMR) head comprising:
   a slider having a leading edge, a trailing edge, and an air bearing surface (ABS); and
   a near field transducer disposed in the slider and having a distal end proximate the ABS;
   wherein:
      the distal end of the near field transducer is recessed from the ABS when no optical power is applied to the near field transducer, and is co-planar with the ABS when a predetermined amount of optical power is applied to the near field transducer,
      a portion of the slider surrounding the distal end forms a concave surface having a continuously varying slope when no optical power is applied to the near field transducer, and a flat surface coplanar with the ABS and the distal end of the near field transducer when the predetermined amount of optical power is applied to the near field transducer, and
   wherein applying the optical power comprises coupling light into a waveguide formed in the EAMR head and directing the coupled light to the near field transducer via the waveguide.

2. The EAMR head of claim 1, further comprising:
   a laser diode integrated on the slider, the laser diode configured to supply laser light to the near field transducer during a recording operation of the EAMR head.

3. The EAMR head of claim 1, wherein the waveguide is optically coupled to the near field transducer.

4. The EAMR head of claim 1, wherein the waveguide is configured to direct laser light received from an external laser to the near field transducer during a recording operation of the EAMR head.

5. The EAMR head of claim 1, wherein the predetermined amount of optical power is an operational level of optical power during a recording operation of the EAMR head.

6. The EAMR head of claim 1, wherein the concave curvilinear surface is formed during fabrication of the magnetic head by removing a portion of the near field transducer protruding beyond the ABS while applying optical power to the near field transducer.

7. The EAMR head of claim 6, wherein the applying optical power to the near field transducer and the removing the protruded portion thereof are iteratively repeated, wherein a greater level of optical power is applied to the near field transducer in each iteration, and wherein the greater level of optical power in each iteration causes a further portion of the near field transducer to protrude.

8. The EAMR head of claim 7, wherein a level of optical power applied to the near field transducer in a final iteration is an operational level of optical power for use during a recording operation of the EAMR head.

9. The EAMR head of claim 6, wherein the applying optical power to the near field transducer and the removing the protruded portion thereof occur concurrently, and wherein the optical power applied to the near field transducer is gradually increased while removing a protruded portion of the near field transducer.

10. The EAMR head of claim 7, wherein the optical power applied to the near field transducer is increased to an operational level of optical power for use during a recording operation of the EAMR head.

* * * * *